J. W. McELVAIN.
PNEUMATIC TIRE.
APPLICATION FILED OCT. 28, 1918.

1,358,962.

Patented Nov. 16, 1920.

Inventor
James W. McElvain

By Whittemore, Hulbert & Whittemore
Attorneys

UNITED STATES PATENT OFFICE.

JAMES W. McELVAIN, OF SPRINGFIELD, ILLINOIS.

PNEUMATIC TIRE.

1,358,962.  Specification of Letters Patent.  Patented Nov. 16, 1920.

Application filed October 28, 1918. Serial No. 259,896.

*To all whom it may concern:*

Be it known that I, JAMES W. McELVAIN, a citizen of the United States of America, residing at Springfield, in the county of Sangamon and State of Illinois, have invented certain new and useful Improvements in Pneumatic Tires, of which the following is a specification, reference being had therein to the accompanying drawings.

This invention relates to pneumatic tires and its object is to safeguard such tires against deflation by puncture by the provision of an interliner continuously extending around the tire and subjected to compression stresses such as will not only strongly resist puncture but will cause the material to close in upon a puncture after the object producing the same has been withdrawn so as to be virtually " self-healing."

Figure 1:
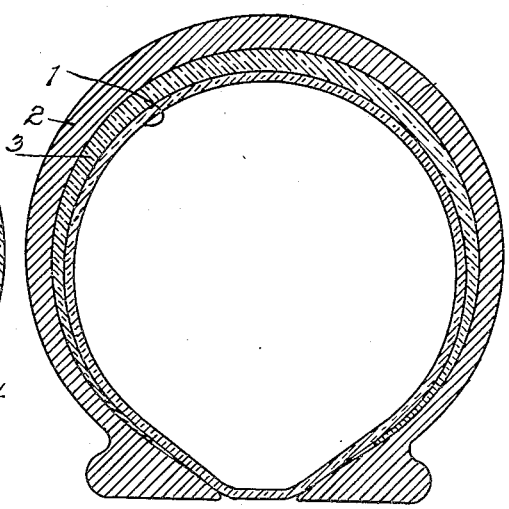
Figure 1 is a cross-section view of a tire constructed in accordance with the invention.
Figure 2:
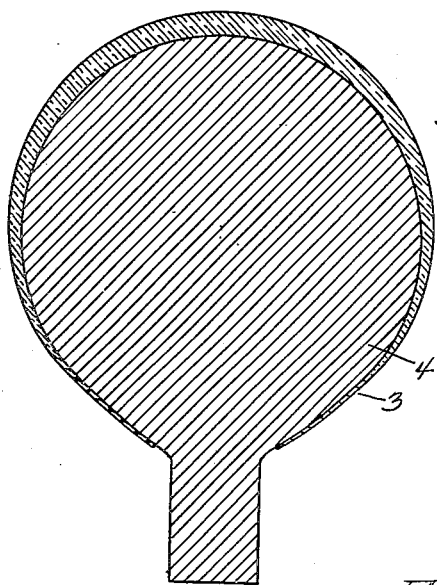
Fig. 2 is a cross-sectional view of the interliner and the core on which it is formed.
Figure 3:
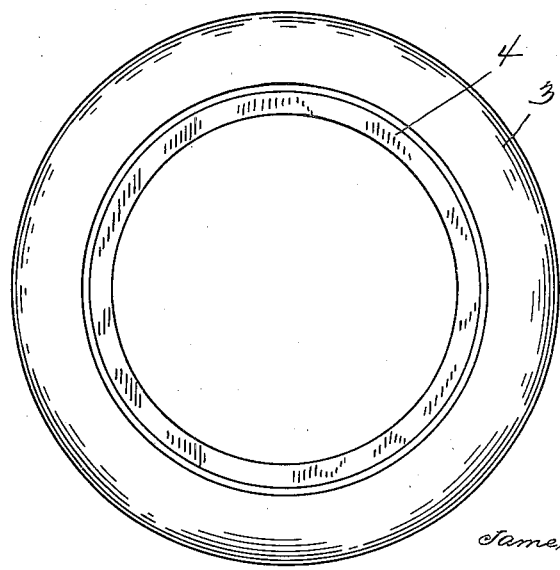
Fig. 3 is a view of said interliner and core on a reduced scale.

In these views, the reference characters 1 and 2, respectively, designate an air tube and a tire casing of ordinary construction, and 3 an interliner interposed between said tube and casing. The interliner is formed of rubber or some similar material and is molded to shape upon an annular core 4, as is illustrated in Figs. 2 and 3. The middle portion of said interliner is formed of suitable thickness while its sides are gradually tapered toward its edge portions, the latter being quite thin. After the interliner has acquired its " set " upon the core 4, the latter is removed therefrom. The interliner is then turned inside out, and this places the material thereof under compression, which compression is most marked at the tread portion of the interliner. In addition to the compressive stress produced in the interliner, as above described, other compressive stresses result from forming said interliner slightly oversize relative to the casing 2, these stresses being produced upon inflation of the air tube. Before removing the interliner from the core 4 it is given a coating of cement, and the surface thus coated comes in contact with the air tube 1 when the interliner has been applied to a tire. When the tire is in use, the resulting warmth softens the cement and adhesion of the interliner to the air tube results.

In the use of the above-described construction, the interliner reinforces the casing in resisting access of any foreign body to the inner tube. In case a puncture of said tube does occur, however, the opening through the interliner closes up because of the compression stresses in the rubber and prevents escape of air unless the opening is quite large. The adhesion between the tube and interliner prevents the air escaping from the tube around the same and out of the casing between the same and the rim.

What I claim as my invention is:

1. A pneumatic tire comprising an air tube, a casing for said tube and an interliner formed of rubber or like material between said tube and casing having a compressive stress acting in its tread portion independently of air pressure, the surface of said interliner adjacent to said air tube being cemented for adhesion thereto.

2. An interliner for use between the inner tube and outer casing of a pneumatic tire comprising an annular member of U-shaped cross-section with its portion adjacent to the inner face under both longitudinal and lateral compressive stresses when in normal position of use, said inner face being coated for adhesion to the outer surface of the air tube when the tire is inflated.

In testimony whereof I affix my signature.

JAMES W. McELVAIN.